(12) United States Patent
Noh et al.

(10) Patent No.: US 10,117,190 B2
(45) Date of Patent: Oct. 30, 2018

(54) METHOD AND APPARATUS FOR CONTROLLING TRANSMISSION POWER IN WIRELESS COMMUNICATION SYSTEM

(71) Applicant: ELECTRONICS AND TELECOMMUNICATIONS RESEARCH INSTITUTE, Daejeon (KR)

(72) Inventors: Gosan Noh, Daejeon (KR); Yeong Jin Kim, Daejeon (KR); Il Gyu Kim, Chungcheongbuk-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/628,754

(22) Filed: Jun. 21, 2017

(65) Prior Publication Data
US 2017/0367053 A1   Dec. 21, 2017

(30) Foreign Application Priority Data

Jun. 21, 2016  (KR) .................. 10-2016-0077353
May 17, 2017  (KR) .................. 10-2017-0061273

(51) Int. Cl.
*H04B 7/00* (2006.01)
*H04W 52/14* (2009.01)
(Continued)

(52) U.S. Cl.
CPC ......... *H04W 52/146* (2013.01); *H04W 52/16* (2013.01); *H04W 52/367* (2013.01);
(Continued)

(58) Field of Classification Search
CPC . H04W 52/146; H04W 52/16; H04W 52/367; H04W 52/38; H04W 72/04; H04W 72/1252

See application file for complete search history.

(56) References Cited

U.S. PATENT DOCUMENTS 6,144,861 A * 11/2000 Sundelin ............... H04W 52/24
455/442
6,487,191 B1 * 11/2002 Kang ................. H04W 52/143
370/335
(Continued)

FOREIGN PATENT DOCUMENTS

JP       2001-217774 A    8/2001
KR   10-2004-0056483 A   7/2004
(Continued)

*Primary Examiner* — Dominic Rego
(74) *Attorney, Agent, or Firm* — LRK Patent Law Firm (57) ABSTRACT

In a wireless communication system in which a plurality of base stations each forming a directional beam in one direction are disposed along a predetermined path, each base station estimates a distance from installed in a mobile body moving along the path if the TE enters a cell area of the corresponding base station; and controls the transmission power using a distance from the estimated TE so that a difference between received signal strength of the corresponding base station and the received signal strength of neighboring base stations measured by the TE in a cell boundary area between the base stations does not exceed a predetermined threshold value.

12 Claims, 5 Drawing Sheets

(51) Int. Cl.
*H04W 52/36* (2009.01)
*H04W 52/38* (2009.01)
*H04W 72/04* (2009.01)
*H04W 72/12* (2009.01)
*H04W 52/16* (2009.01)

(52) U.S. Cl.
CPC ........... *H04W 52/38* (2013.01); *H04W 72/04* (2013.01); *H04W 72/1252* (2013.01)

(56) References Cited

U.S. PATENT DOCUMENTS

| | | | |
|---|---|---|---|
| 8,805,398 | B2 | 8/2014 | Morita et al. |
| 9,264,956 | B2 | 2/2016 | Kim et al. |
| 9,313,753 | B2* | 4/2016 | Jeon ................ H04W 52/40 |
| 2003/0050084 | A1* | 3/2003 | Damnjanovic ....... H04W 52/40 455/522 |
| 2006/0061469 | A1* | 3/2006 | Jaeger ................ B60R 25/00 340/539.13 |
| 2007/0015511 | A1* | 1/2007 | Kwun ................ H04W 36/30 455/436 |
| 2007/0184863 | A1* | 8/2007 | Takagi ................ H04W 52/281 455/507 |
| 2008/0268872 | A1* | 10/2008 | Rofougaran ....... G01C 19/5656 455/456.6 |
| 2009/0312047 | A1* | 12/2009 | Satou ................ H04W 52/242 455/522 |
| 2010/0144338 | A1* | 6/2010 | Kim ................ H04W 52/16 455/422.1 |
| 2010/0238897 | A1* | 9/2010 | Kiribayashi ........ H04W 28/18 370/331 |
| 2011/0143806 | A1* | 6/2011 | Song ................ H04W 16/08 455/522 |
| 2013/0176874 | A1* | 7/2013 | Xu ................ H04W 52/242 370/252 |
| 2014/0162652 | A1 | 6/2014 | Kang et al. |
| 2014/0213282 | A1* | 7/2014 | Chin ................ H04W 24/00 455/456.1 |
| 2014/0349658 | A1* | 11/2014 | Lin ................ H04W 36/32 455/441 |
| 2014/0349704 | A1* | 11/2014 | Xiao ................ H04W 28/08 455/525 |
| 2015/0055563 | A1* | 2/2015 | Zhu ................ H04W 52/243 370/329 |
| 2015/0282100 | A1 | 10/2015 | Lee et al. |
| 2015/0312404 | A1* | 10/2015 | Abramson ........ H04W 4/027 455/418 |
| 2016/0011294 | A1* | 1/2016 | Kim ................ G01S 5/0236 455/456.1 |
| 2016/0219539 | A1 | 7/2016 | Kim et al. |
| 2017/0093846 | A1* | 3/2017 | Lopez Lecube .... H04L 63/0853 |
| 2018/0015329 | A1* | 1/2018 | Burich ................ G06F 11/3438 |

FOREIGN PATENT DOCUMENTS

| | | |
|---|---|---|
| KR | 10-2014-0062561 A | 5/2014 |
| KR | 10-2014-0075314 A | 6/2014 |
| KR | 10-1507529 B1 | 4/2015 |
| WO | 2012-134156 A2 | 10/2012 |

* cited by examiner

METHOD AND APPARATUS FOR CONTROLLING TRANSMISSION POWER IN WIRELESS COMMUNICATION SYSTEM

CROSS-REFERENCE TO RELATED APPLICATION

This application claims priority to and the benefit of Korean Patent Application Nos. 10-2016-0077353 and 10-2017-0061273, filed in the Korean Intellectual Property Office on Jun. 21, 2016 and May 17, 2017, respectively, the entire contents of which are incorporated herein by reference.

BACKGROUND OF THE INVENTION

1. Field of the Invention

The present invention relates to a method and an apparatus for controlling transmission power in a wireless communication system, and more particularly, to a method and an apparatus for controlling transmission power in a wireless communication system capable of decreasing handover failure probability at a cell boundary in a linear cellular communication system in which each base station uses an unidirectional beam.

2. Description of Related Art

A cellular wireless communication system includes a plurality of base stations disposed at a predetermined distance to support a wireless access of user terminals distributed in a space. The user terminal may have mobility, and therefore a handover for changing an access from a currently accessed base station to neighboring base stations is required. The handover in a current cellular wireless communication system is performed to access a base station having large signal strength measured based on a value obtained by allowing a user terminal to measure signal strength from a base station. For example, in a long term evolution (LTE) system, the handover is carried out using measurement values such as reference signal received power (RSRP) and reference signal received quality (RSRQ).

The handover based on the signal strength is performed when the signal strength of the neighboring cells is larger than that of the current cell by a predetermined value or more as a result of comparing the value of the signal strength of the current cell with the value of the signal strength of the neighboring to cells. Since the further away from the base station, the smaller the signal strength, both of the signal strength of the current cell and the signal strength of the neighboring cells are considerably decreased at the cell boundary area where the handover is carried out. Therefore, a process of comparing signal strength between attenuated signals is performed.

To support a wireless access to a terminal installed in a train or a vehicle moving along a defined path, a linear cellular wireless communication system may be used. Unlike the typical wireless communication system, the linear cellular wireless communication system needs to support a wireless access only in a linear space having a narrow width and therefore the base stations are disposed in a row at a predetermined distance along a rail or a road. In this case, a directional antenna is applied to the base station to generate a narrow beam width, thereby concentrating a signal on a rail or a road. At this point, the respective base station antennas may generate a directional beam in either a moving direction of a terminal or an opposite direction to the moving direction thereof. In this case, the terminal needs to process only a beam received in a predetermined direction even when moving between the base stations and therefore is advantageous in signal processing and radio frequency (RF) processing associated with mobility.

However, in the case of the linear cellular wireless communication system in which the respective base stations use a unidirectional beam, there arises a problem in that a difference between a value of signal strength of a serving cell which is measured for the handover and a value of signal strength of neighboring cells is considerably large. For example, as a train approaches to any one of base stations installed along a rail, signal strength received by a terminal from the corresponding base station is increased, and as a result the received signal strength becomes a very large value. However, if a train passes through the corresponding base station, the terminal receives a signal from a base station at the next location, and since the base station at the next location is located at a far distance from the terminal, the signal strength received by the terminal from the base station at the next location becomes a very small value. As described above, in the case of the linear cellular wireless communication system, since the received signal strength of the cell is suddenly changed from a very large value to a very small value or from a minimum value to a maximum value, the difference between the signal strength of the serving cell and the signal strength of the neighboring cells becomes very large and the difference between the two signal strengths is very large, such that if the two signals do not enter a dynamic range of a transceiver, the signal of the serving cell and the signal of the neighboring cells may not be measured simultaneously. Therefore, it is difficult to apply the existing method for determining whether to perform the handover by simultaneously measuring the signal strength of the serving cell and the signal strength of the neighboring cell.

SUMMARY OF THE INVENTION

The present invention has been made in an effort to provide a method and an apparatus for controlling transmission power in a wireless communication system having advantages of decreasing handover failure probability occurring at a cell boundary during handover when signal strength of to a serving cell and signal strength of neighboring cells are large.

An exemplary embodiment of the present invention provides a method for controlling transmission power of each base station in a wireless communication system in which a plurality of base stations each forming a directional beam in one direction are disposed along a predetermined path. The method includes: estimating a distance from installed in a mobile body moving along the path if the TE enters a cell area of the corresponding base station; and controlling the transmission power using a distance from the estimated TE so that a difference between received signal strength of the corresponding base station and the received signal strength of neighboring base stations measured by the TE in a cell boundary area between the base stations does not exceed a predetermined threshold value.

The controlling may include slowly increasing the transmission power up to a predetermined maximum transmission power value in proportion to the distance if a moving direction of the mobile body is the same direction as a beam forming direction.

The controlling may include slowly decreasing the transmission power from the predetermined maximum transmission power value in inverse proportion to the distance if a moving direction of the mobile body is an opposite direction to a beam forming direction.

The controlling may include lowering the transmission power only in some of a section including a point where the difference between the received signal strength of the base station and the received signal strength of the neighboring base stations is maximal.

The controlling of the transmission power may include controlling the transmission power depending on the distance so that the received signal strength of the base station measured by the TE has a constant value.

The estimating may include estimating the distance by applying a speed estimated by a just previous base station.

The just previous base station may estimate the speed of the TE using a distance between a base station prior to the just previous base station and the just previous base station and time during which the TE accesses the just previous base station.

The estimating may include estimating the distance by applying a speed and an acceleration estimated by a just previous base station.

Another embodiment of the present invention provides an apparatus for controlling transmission power of base stations disposed at a predetermined distance along a path in a wireless communication system. The apparatus for controlling transmission power may include an antenna and a processor. The antenna may form a directional beam in one direction toward the path.

The processor may estimate a distance from terminal equipment (TE) installed in a mobile body moving along the path if the TE enters an area of the antenna, and controlling the transmission power using a distance from the estimated TE so that a difference between received signal strength of the corresponding base station and the received signal strength of neighboring base stations measured by the TE in a cell boundary area between the base stations and the neighboring base stations does not exceed a predetermined threshold value.

The processor may decrease the transmission power of the base station and increase the transmission power of the neighboring base stations, at the cell boundary area.

The processor may slowly increase the transmission power up to a predetermined maximum transmission power value in proportion to the distance if a moving direction of the mobile body is the same direction as a beam forming direction.

The processor may slowly decrease the transmission power from a predetermined maximum transmission power value in inverse proportion to the distance if the moving direction of the mobile body is an opposite direction to the beam forming direction.

The processor may lower the transmission power only in some of a section including a point where the difference between the received signal strength of the base station and the received signal strength of the neighboring base stations is maximal.

The processor may estimate the distance using at least one of a speed and an acceleration estimated by a just previous base station.

The just previous base station may estimate the speed of the TE using a distance between a base station prior to the just previous base station and the just previous base station and time during which the TE accesses the just previous base station.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, "comprising" any components will be understood to to imply the inclusion of other elements rather than the exclusion of any other elements.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may also include all or some of the functions of the MT, the MS, the AMS, the HR-MS, the SS, the PSS, the AT, the UE, and the like Further, the base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femoto BS), a home node B (HNB), a home eNodeB (HeNB), a pico base station (pico BS), a metro base station (metro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like. Further, the base station may be called a remote radio head (RRH).

Hereinafter, a method and an apparatus for controlling transmission power in a wireless communication system according to an exemplary to embodiment of the present invention will be described in detail with reference to the accompanying drawings.

Figure 1:
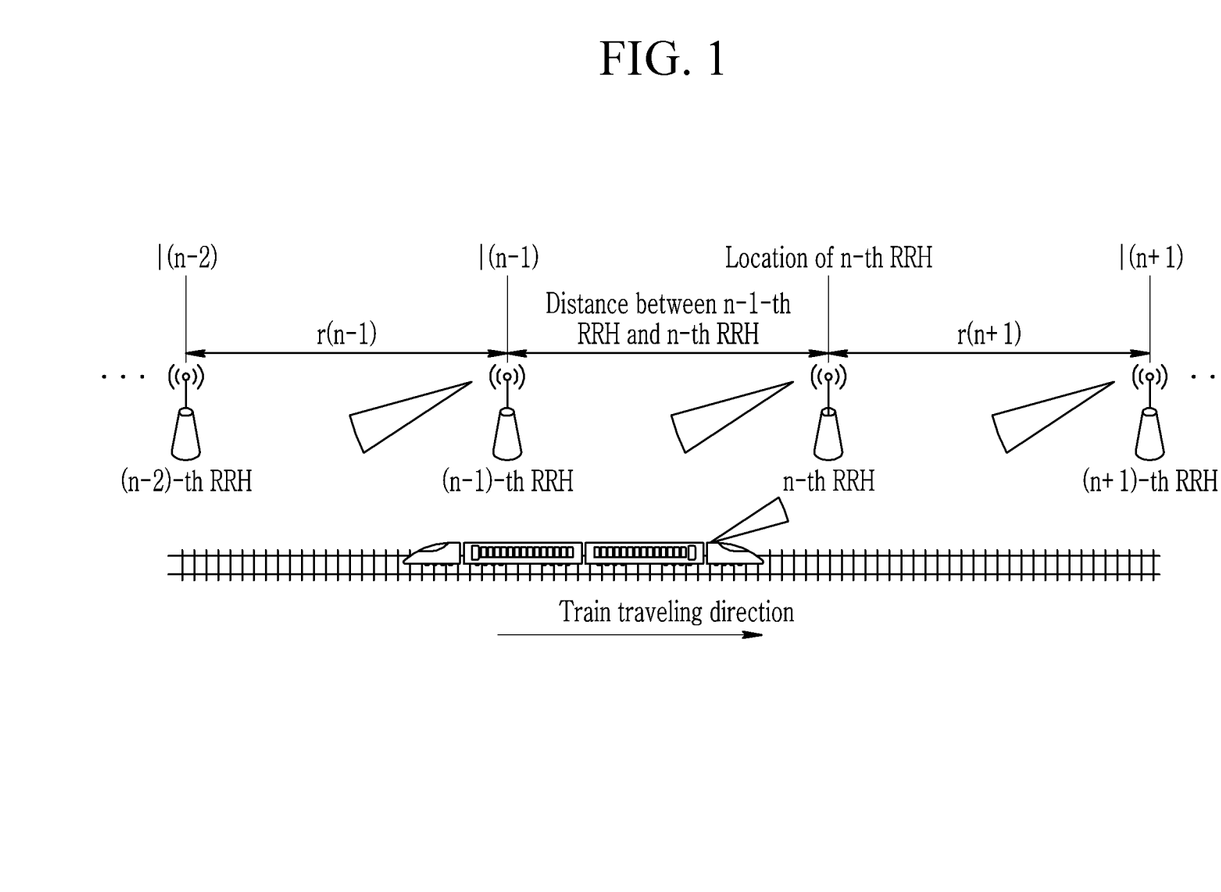
FIG. 1 is a diagram illustrating an example of a wireless communication to system according to an exemplary embodiment of the present invention.

FIG. 1 is a diagram illustrating an example of a wireless communication system according to an exemplary embodiment of the present invention.

As illustrated in FIG. 1, the wireless communication system according to the exemplary embodiment of the present invention depends on a form in which base stations are linearly disposed along a predetermined path like a rail or a road.

In the wireless communication system according to the exemplary embodiment of the present invention, the base station may be configured to include a plurality of remote radio heads (RRHs) that are installed in a service area to amplify an RF signal and transmit the amplified RF signal to an antenna and a digital unit (DU) that is connected to the plurality of RRHs to serve to process a digital signal. In this case, the plurality of RRHs are linearly disposed along a predetermined path. In the following description, it is assumed that the plurality of RRHs are linearly disposed along the predetermined path.

As described above, a terminal in the wireless communication system moves only in a predetermined space, and a power control according to an exemplary embodiment of the present invention may be applied to the wireless communication system in which the terminal moves only in a predetermined space.

Each RRH may have a directional antenna that generates a narrow beam width to concentrate a signal on a path. Each RRH may have the directional antenna that generates a directional beam in a moving direction of a mobile body or in an opposite direction to the moving direction thereof. FIG. 1 illustrates an example in which each RRH forms the directional beam in the opposite direction to the moving direction of the mobile body.

Further, the terminal in the wireless communication system according to the exemplary embodiment of the present invention serves to communicate with the base station through the mobile body, for example, terminal equipment (TE) in a train. The TE installed in a train may also have at least one directional antenna that forms a beam having a narrow width in a direction of the RRHs installed along a path.

Each RRH has a unique location value, and in FIG. 1, l(n) means a location of n-th RRH. r(n) between the RRHs may be defined as a distance between (n−1)-th RRH and n-th RRH. That is, r(n)=l(n)−l(n−1). Further, time for the TE to perform handover from the (n−1)-th RRH to the n-th RRH and then handover to (n+1)-th RRH, that is, time during which the TE accesses the n-th RRH is defined as Δt(n).

In general, traveling features of a train are that when a train starts from a station, the train is accelerated to a predetermined acceleration then runs at a predetermined speed and is again decelerated to a predetermined acceleration to stop a station. Further, a change in speed is not large, and therefore the speed or acceleration of the train may be measured without acquiring separate train control information using a distance between the RRHs, an access time, or the like and handover performance may be increased by using the measured speed or acceleration.

The exemplary embodiment of the present invention suggests a method to for determining a power control and handover timing for smoothly enabling an inter-cell handover using the above features.

Figure 2:
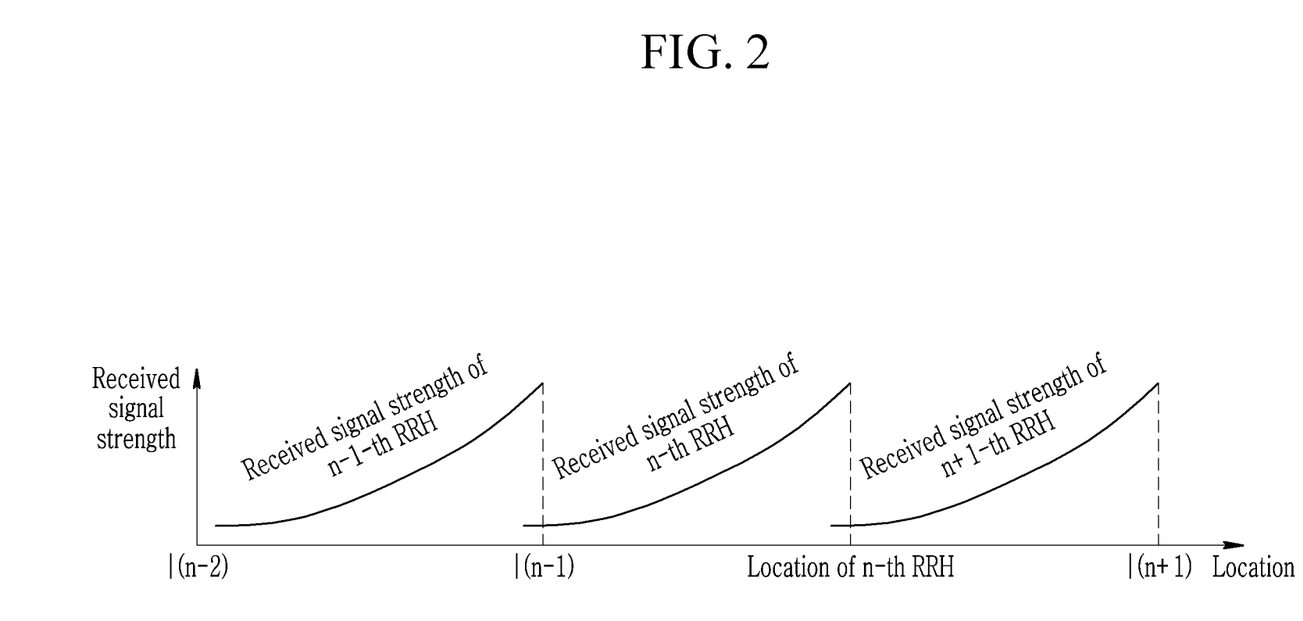
FIG. 2 is a diagram illustrating an example of a received power distribution of TE in the environment as illustrated in FIG. 1.

FIG. 2 is a diagram illustrating an example of a received power distribution of TE in the environment as illustrated in FIG. 1.

When there is no transmission power control at each RRH, the predetermined transmission power is used at all the RRHs and the received power distribution of the TE depending on a train location is shown in FIG. 2. That is, as the TE approaches the locations of each RRH, the signal strength received from the corresponding RRH is getting larger and as the TE is far away from the corresponding RRH, the signal strength received from the corresponding RRH is getting smaller. In this case, received signal strength from the RRH of the serving cell becomes a very large value at a boundary between the RRHs, that is, a cell boundary point and received signal strength from RRH of a target cell to be handed over becomes a very small value. As described above, a difference between the received signal strength from the RRH of the serving cell and the received signal strength from the RRH of the target cell becomes very large, such that the handover is not smoothly performed.

To solve the above problem, the exemplary embodiment of the present invention uses a method for controlling transmission power of RRH depending on an estimated location of TE.

Figure 3:
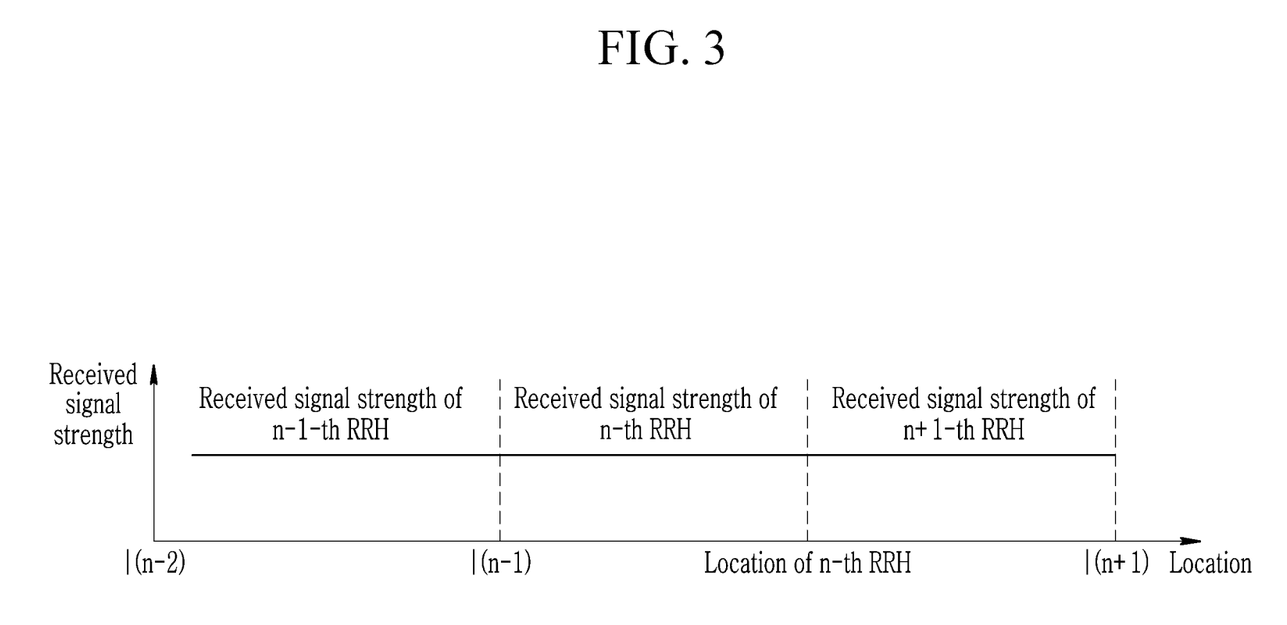
FIG. 3 is a diagram illustrating an example of the received power distribution of TE based on a power control according to an exemplary embodiment of the present invention.

FIG. 3 is a diagram illustrating an example of the received power distribution of TE based on a power control according to an exemplary embodiment of the present invention.

If a train is traveled in a direction facing a beam as illustrated in FIG. 1, the respective RRHs control the transmission power in a manner that increases the transmission power at the moment that the TE enters in the cell area and gradually decreases the transmission power until the TE exits the cell area.

Meanwhile, if a train is traveled in an opposite direction to the direction facing the beam, the respective RRHs control the transmission power in a manner that decreases the transmission power at the moment that the TE enters in the cell area and gradually increases the transmission power until the TE exits the cell area.

By doing so, finally, as illustrated in FIG. 3, the received signal strength of the TE may be maintained constantly.

As described above, the received signal strength of the serving cell may be lowered at the cell boundary area by the transmission power control, such that it is possible to relieve the phenomenon that the signal of the target cell is not detected due to the strong signal of the serving cell at the cell boundary area.

Figure 4:
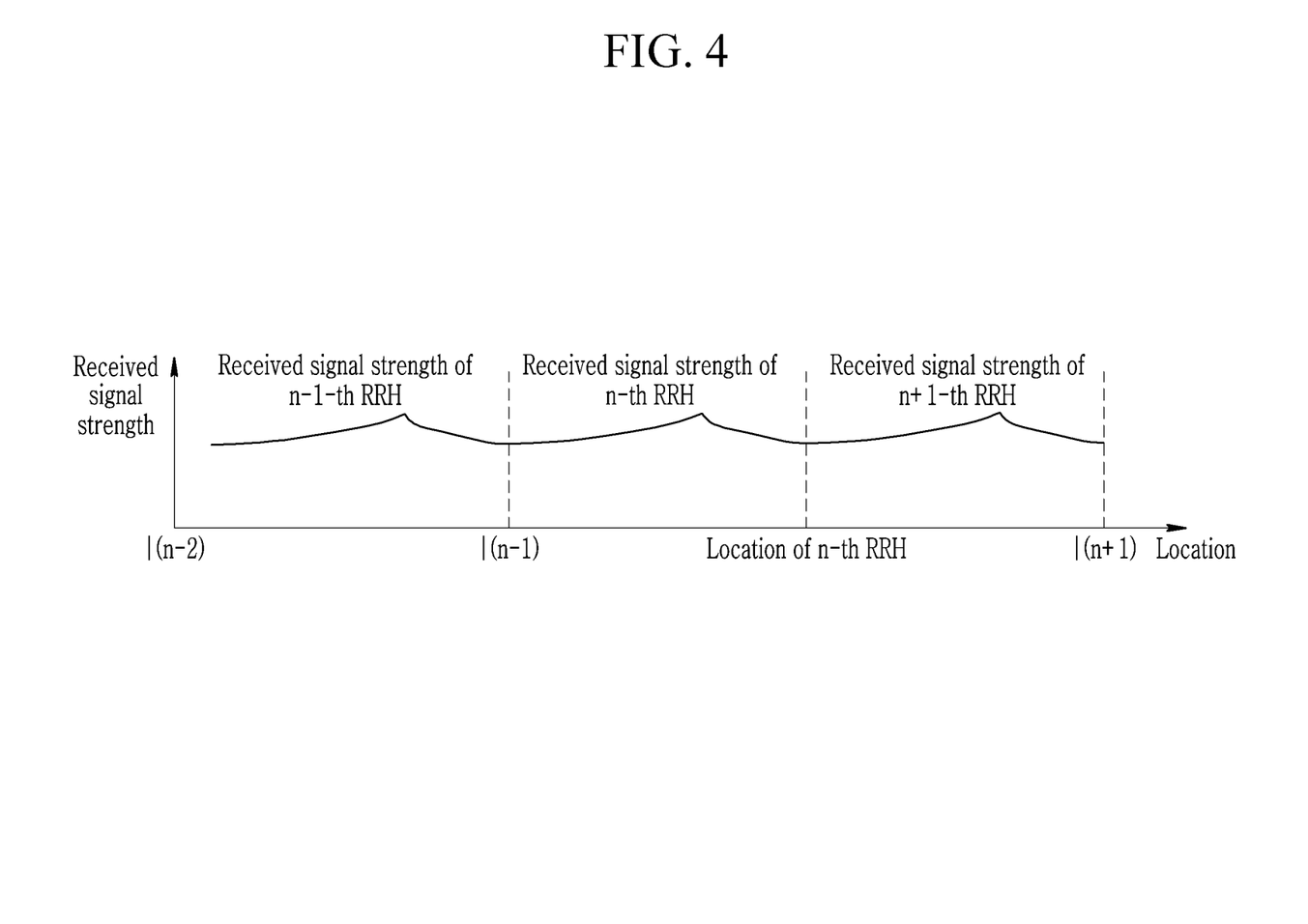
FIG. 4 is a diagram illustrating an example of a received power distribution of TE based on a power control according to another exemplary embodiment of the present invention.

Further, according to the exemplary embodiment of the present invention, if the received signal strength of the target cell exceeds a predetermined threshold value, a scheme of performing a handover to a target cell may be applied. FIG. 4 is a diagram illustrating an example of a received power distribution of TE based on a power control according to another exemplary embodiment of the present invention.

The respective RRHs do not perform the power control at the early stage that the TE enters the cell area and then may lower the transmission power only a predetermined section where the received signal strength of the TE is to increased. The predetermined section represents from the section where the received signal strength exceeds the set threshold value to the section up to the cell boundary point where the received signal strength of the TE becomes a maximum value.

Figure 5:
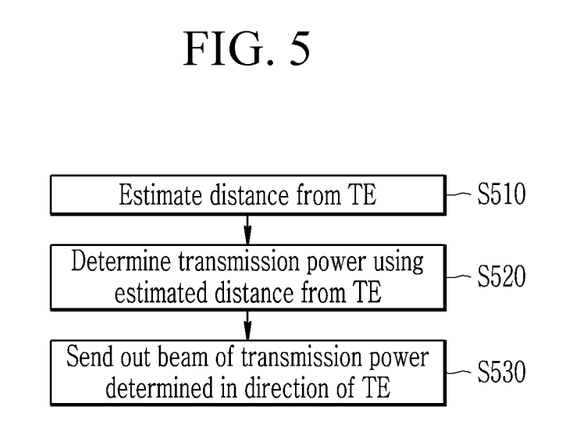
FIG. 5 is a flow chart illustrating a method for controlling transmission power according to an exemplary embodiment of the present invention.

Then, the signal strength of the respective RRHs which is received in the TE is maintained at a predetermined level for the predetermined section as illustrated in FIG. 5.

In this case, to apply the location-based power control of the TE, there is need to first know the received signal attenuation depending on the distance. According to a path-loss model, if it is assumed that the transmission power of the n-th RRH is assumed to be $P_n$, the power value of the received signal is decreased depending on the distance d from the corresponding RRH and may be represented like the following Equation 1.

$$Q_n(d) = P_n - a - b \log_{10}(d) \qquad \text{<Equation 1>}$$

In the above Equation 1, constants a and b are values that are defined according to the channel environment. The values of a and b are not greatly changed and therefore may be estimated at low frequency and used.

Therefore, the transmission power control at the n-th RRH for achieving a predetermined received power value Q may be represented by the following Equation 2.

$$P_n(d) = \begin{cases} Q + a + b \log_{10}(d) & P_n(d) \le P_{max} \\ P_{max} & P_n(d) > P_{max} \end{cases} \qquad \text{<Equation 2>}$$

According to the above Equation 2, the transmission power of the RRH depends on a function of a distance d from the RRH and may not exceed maximum transmission power $P_{max}$. Therefore, if the value of the d is known, the optimal power control may be performed.

Meanwhile, as illustrated in FIG. 1, if a train travels in a direction facing a beam, the d is getting smaller in a coverage area of the RRH, while if a train travels in an opposite direction to the direction facing the beam, the d is getting larger. Then, a method for estimating a distanced will be described.

The distance d may be represented by a value obtained by integrating a speed. That is, if a distance from a location at the moment that a train enters the section of the n-th RRH to the n-th RRH is $d_0$ and a speed is v, the following Equation 3 is established.

$$d = d_0 + vt \qquad \text{<Equation 3>}$$

Here, if a train travels in a direction facing a beam of the n-th RRH, $d_0 = r(n)$ and if a train travels in an opposite direction to the direction facing the beam of the n-th RRH, $d_0 = 0$. If a train travels in a direction facing a beam, the speed v is a negative number, while a train travels in an opposite direction to the direction facing the beam, the speed v is a positive number. The speed v is almost constantly maintained without being greatly changed in most section due to train characteristics but is determined by acceleration a in an early acceleration and deceleration section. That is, the following Equation 4 is established.

$$v = v_0 + at \qquad \text{<Equation 4>}$$

If the accurate speed and the acceleration value are known using the above relationship, the accurate power control may be performed at the RRH, such that the predetermined received signal power may be maintained at the TE. At this point, the speed and the acceleration may also be estimated using characteristics of train communication.

If a train travels without a great speed change, it may be assumed that the speed is constant and the acceleration is 0 in the respective RRH sections. In this case, the speed in the n-th RRH section may apply the speed estimated in the (n−1)-th RRH section as it is.

The speed estimated in the (n−1)-th RRH section becomes a value obtained by dividing distance r(n−1) of the (n−1)-th RRH section by an access time Δt (n−1) to the (n−1)-th RRH as represented by the following Equation 5.

$$v(n-1) = \frac{r(n-1)}{\Delta t(n-1)} \qquad \text{<Equation 5>}$$

The n-th RRH applies the speed estimated in the (n−1)-th RRH section as the speed in the n-th RRH section and the distance d and the transmission power may be calculated using the speed in the n-th RRH section.

If it is assumed that there is the acceleration section or the deceleration section in which the speed is not constant, the acceleration is not 0 in the acceleration section and the deceleration section and the acceleration is constant.

In this case, the acceleration may be estimated, by dividing the speed change estimated in the neighboring RRH sections by the method for estimating a speed described above, by time. The acceleration in the (n−1)-th RRH section may be estimated by the following Equation 6.

$$a(n-1) = \frac{v(n-1) - v(n-2)}{\Delta t(n-1)} \qquad \text{<Equation 6>}$$

The respective RRHs may apply the acceleration estimated in the just previous RRH section to the section of the corresponding RRH as they are, the distance d may be estimated using the acceleration, and the transmission power may control using the estimated distance d.

FIG. 5 is a flow chart illustrating a method for controlling transmission power according to an exemplary embodiment of the present invention. In FIG. 5, for convenience of explanation, a method for controlling transmission power in n-th RRH will be described.

Referring to FIG. 5, if the TE enters the n-th RRH section, the n-th RRH estimates the distance from the TE (S510). The n-th RRH may estimate the distance by the same method as the above Equation 3 and may use the speed and/or acceleration of the TE in the just previous RRH section as described above to estimate the distance.

The n-th RRH determines the transmission power using the estimated to distance from the TE (S520). The n-th RRH is proportional to the estimated distance from the TE to increase the transmission power up to the predetermined maximum transmission power value, such that the received signal power from the n-th RRH is constant in the TE. For example, the n-th RRH may control the transmission power depending on the estimated distance from the TE using the same method as the above Equation 2 so that the received signal power from the n-th RRH is constant.

The n-th RRH may send out the beam of the transmission power determined in the direction of the TE.

Figure 6:
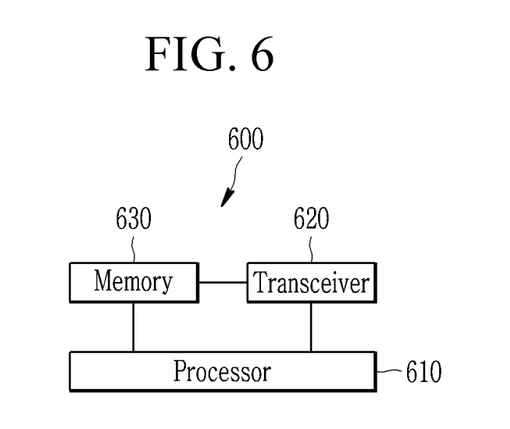
FIG. 6 is a diagram illustrating an apparatus for controlling transmission power according to an exemplary embodiment of the present invention.

FIG. 6 is a diagram illustrating an apparatus for controlling transmission power according to an exemplary embodiment of the present invention.

Referring to FIG. 6, an apparatus 600 for controlling transmission power includes a processor 610, a transceiver 620, and a memory 630. The apparatus 600 for controlling transmission power may be implemented in a base station or a digital unit of the base station. The processor 610 may mean a central processing unit (CPU), a graphics processing unit (GPU), or an exclusive process that performs methods according to exemplary embodiments of the present invention.

The processor 610 determines the transmission power using the estimated distance from the TE as described with reference to FIGS. 1 to 5. That is, the processor 610 controls the transmission power so that the difference in the received signal strength between two neighboring base stations that is measured by the TE at the handover boundary area does not exceed the predetermined threshold value. The threshold value may be set to be a value to at which the handover failure does not occur due to the difference in the received signal strength between two neighboring base stations.

The transceiver 620 is connected to the processor 610 to transmit and receive a wireless signal to and from the TE. The transceiver 620 may include two antennas that form a directional beam in different directions.

The memory 630 stores instructions which are performed by the processor 610 or loads instructions from a storage (not illustrated) and temporarily stores the instructions and the processor 610 executes the instructions which are stored or loaded in the memory 630.

The processor 610 and the memory 630 are connected to each other through a bus (not illustrated) and an input/output interface (not illustrated) may also be connected to the bus. In this case, the transceiver 620 is connected to the input/output interface and peripheral devices such as an input device, a display, a speaker, and a storage device may be connected to the input/output interface.

According to an exemplary embodiment of the present invention, it is possible to decrease the difference between the received signal strength of the serving cell and the received signal strength of the neighboring cells at the cell boundary during the handover in the linear cellular wireless communication system. As a result, it is possible to decrease the handover failure probability due to the detection failure of the received signal strength of the neighboring cells.

Although the exemplary embodiment of the present invention has been described in detail hereinabove, the scope of the present invention is not limited to thereto. That is, several modifications and alterations made by those skilled in the art using a basic concept of the present invention as defined in the claims fall within the scope of the present invention.

What is claimed is:

1. A method for controlling transmission power of each base station in a wireless communication system in which a plurality of base stations each forming a directional beam in one direction are disposed along a predetermined path, the method comprising:
   estimating a distance from terminal equipment (TE) installed in a mobile body moving along the path if the TE enters a cell area of a corresponding base station; and
   controlling the transmission power depending on the distance so that a received signal strength of the corresponding base station measured by the TE has a constant value.

2. The method of claim 1, wherein:
   the controlling includes slowly increasing the transmission power up to a predetermined maximum transmission power value in proportion to the distance if a moving direction of the mobile body is the same direction as a beam forming direction.

3. The method of claim 1, wherein:
   the controlling includes slowly decreasing the transmission power from the predetermined maximum transmission power value in inverse proportion to the distance if a moving direction of the mobile body is an opposite direction to a beam forming direction.

4. The method of claim 1, wherein:
   the estimating includes estimating the distance by applying a speed estimated by a just previous base station.

5. The method of claim 4, wherein:
   the just previous base station estimates the speed of the TE using a distance between a base station prior to the just previous base station and the just previous base station and time during which the TE accesses the just previous base station.

6. The method of claim 1, wherein:
   the estimating includes estimating the distance by applying a speed and an acceleration estimated by a just previous base station.

7. A method for controlling transmission power of each base station in a wireless communication system in which a plurality of base stations each forming a directional beam in one direction are disposed along a predetermined path, the method comprising:
   estimating a distance from terminal equipment (TE) installed in a mobile body moving along the path if the TE enters a cell area of a corresponding base station; and
   controlling the transmission power using the distance from the TE so that a difference between a received signal strength of the corresponding base station and a received signal strength of neighboring base stations measured by the TE in a cell boundary area between the base stations does not exceed a predetermined threshold value,
   wherein the controlling includes lowering the transmission power only in some of a section including a point where the difference between the received signal strength of the base station and the received signal strength of the neighboring base stations is maximal.

8. An apparatus for controlling transmission power of a base station disposed at a predetermined distance along a path in a wireless communication system, the apparatus comprising:
   an antenna forming a directional beam in one direction toward the path; and
   a processor estimating a distance from terminal equipment (TE) installed in a mobile body moving along the path if the TE enters an area of the antenna, and controlling the transmission power using the distance from the TE so that a difference between a received signal strength of a corresponding base station and a received signal strength of neighboring base stations measured by the TE in a cell boundary area between the base station and the neighboring base stations does not exceed a predetermined threshold value,
   wherein the processor slowly increases the transmission power up to a predetermined maximum transmission power value in proportion to the distance if a moving direction of the mobile body is the same direction as a beam forming direction.

9. The apparatus of claim 8, wherein:
   the processor slowly decreases the transmission power from a predetermined maximum transmission power value in inverse proportion to the distance if the moving direction of the mobile body is an opposite direction to the beam forming direction.

10. The apparatus of claim 8, wherein:
    the processor lowers the transmission power only in some of a section including a point where the difference between the received signal strength of the base station and the received signal strength of the neighboring base stations is maximal.

11. The apparatus of claim 8, wherein:
the processor estimates the distance using at least one of a speed and an acceleration estimated by a just previous base station.

12. The apparatus of claim 11, wherein:
the just previous base station estimates the speed of the TE using a distance between a base station prior to the just previous base station and the just previous base station and time during which the TE accesses the just previous base station.

* * * * *